(12) United States Patent
Pan

(10) Patent No.: US 8,174,827 B2
(45) Date of Patent: May 8, 2012

(54) PORTABLE TABLET COMPUTING DEVICE WITH A LOW POWER OPERATION MODE AS A MEDIA PLAYER

(76) Inventor: Yang Pan, Singapore (SG)

(*) Notice: Subject to any disclaimer, the term of this patent is extended or adjusted under 35 U.S.C. 154(b) by 212 days.

(21) Appl. No.: 12/696,065

(22) Filed: Jan. 29, 2010

(65) Prior Publication Data

US 2011/0188199 A1    Aug. 4, 2011

(51) Int. Cl.
G06F 1/16 (2006.01)
(52) U.S. Cl. .................. 361/679.55; 345/175; 455/522; 370/311
(58) Field of Classification Search .................. 345/168, 345/169, 173, 175; 455/7, 574, 566, 127.1, 455/522; 340/539.13, 10.42, 5.61; 370/252, 370/315, 311; 361/679.55, 679.43, 679.34, 361/679.58, 679.33, 679.31, 679.27
See application file for complete search history.

(56) References Cited

U.S. PATENT DOCUMENTS

| | | |
|---|---|---|
| 4,903,222 A | 2/1990 | Carter et al. |
| 4,959,887 A | 10/1990 | Gruenberg et al. |
| 5,168,426 A | 12/1992 | Hoving et al. |
| 5,534,893 A | 7/1996 | Hansen, Jr. et al. |
| 5,719,799 A | 2/1998 | Isashi |
| 6,157,958 A | 12/2000 | Armitage et al. |
| 6,272,006 B1 | 8/2001 | Lee |
| 6,275,376 B1 | 8/2001 | Moon |
| 6,301,101 B1 | 10/2001 | Anzai et al. |
| 6,771,494 B2 | 8/2004 | Shimano |
| 6,788,527 B2 | 9/2004 | Doczy et al. |
| 6,928,433 B2 | 8/2005 | Goodman et al. |
| 7,398,535 B2 * | 7/2008 | Zhang ........................ 720/600 |
| 7,925,298 B2 * | 4/2011 | Chen et al. ................ 455/556.1 |
| 2004/0021681 A1 | 2/2004 | Liao |
| 2004/0055446 A1 | 3/2004 | Robbin et al. |
| 2008/0062625 A1 | 3/2008 | Batio |
| 2011/0181518 A1 * | 7/2011 | Pan ............................ 345/173 |

* cited by examiner

Primary Examiner — Hung Duong

(57) ABSTRACT

A portable computing device is disclosed. The device may be based upon a laptop/a netbook computer according to the preferred embodiment. The device comprises a pivotable display screen. The device is operated as a general purpose computing device when the display screen is in a conventional unfolded position. The device is used as a media player when the display is pivoted to be on the top face of the device. The device operated as the media player with a low power processor consumes much less power than as the general purpose computing device.

9 Claims, 6 Drawing Sheets

PORTABLE TABLET COMPUTING DEVICE WITH A LOW POWER OPERATION MODE AS A MEDIA PLAYER

CROSS-REFERENCE TO RELATED APPLICATIONS

Not applicable.

BACKGROUND

1. Field of Invention

This invention relates generally to a portable computing device. More specifically, the invention describes a portable tablet computing device based upon a netbook with a low power operation mode for delivering media assets.

2. Description of Prior Art

Netbooks are a branch of subnotebooks, a rapidly evolving category of small, light and inexpensive laptop computers suited for general computing and accessing web-based applications. With primary focus given to web browsing and e-mailing, netbooks rely heavily on the Internet for remote access to web-based applications and are targeted increasingly at cloud computing users who rely on severs and require a less powerful client computer.

Because they are very portable, netbooks are rapidly gaining popularity among Internet users. On the other hand, a tablet computer refers to a slate shaped portable computing device, equipped with a touch-screen. A user operates the device by the use of his or her finger or a stylus.

A netbook with a pivot and hinge mechanism for its display screen may be considered as one of various implementations of a portable tablet computing device. Newly release iPad from Apple Inc, Cupertino, Calif. may be another implementation of a portable tablet computer without an attached keyboard.

A portable tablet based upon a netbook may be used by a user to select and to play a media assets. The media asset may be delivered to the user by employing a media player program in the device. However, the user may be more accustomed to select and to play the media asset using a portable media player such as for example, an iPod from Apple. The portable media player as a dedicated media delivery system provides a more user friendly interface.

Therefore, it is desirable to have a portable tablet computing device providing a means of delivering a media asset to a user in a similar manner as in a portable media player.

SUMMARY OF THE INVENTION

It is an object of the present invention to provide an improved portable tablet computing device which delivers media assets to a user in a similar manner as in a dedicated portable media player, while the portable device can also be used as a general computing device.

According to a preferred embodiment of the present invention, the improved portable tablet computing device comprises a display screen, a housing part and a pivot and hinge part. The display screen may be pivoted to be on the top face of the device when it is used as a media player. The device is operated in a low power mode as a media player. The low power consumption may be achieved through a low power media processor and/or a simplified operation system for the media player. The media player may be a separate device integrated with the netbook according to one implementation. The media player and the netbook may share a number of components according to another implementation. Media assets may be displayed using a hierarchical user interface as used in a dedicated media player.

The proposed tablet computing device is operated as a general purpose computing device when the display screen is in a normal position as a conventional netbook. A switch is used to select the device's operation mode as a media player or as a general purpose computing device.

BRIEF DESCRIPTION OF THE DRAWINGS

For a more complete understanding of the present invention and its various embodiments, and the advantages thereof, reference is now made to the following description taken in conjunction with the accompanying drawings, in which.

DETAILED DESCRIPTION

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

The present disclosure uses a netbook with a pivotable display screen as an exemplary case to illustrate the inventive concept. The inventive concept may be applied to any other general purpose portable computing devices. Netbooks are a branch of subnotebooks, a rapidly evolving category of small, light ad inexpensive laptop computers suited for general computing and accessing web-based applications.

The media assets may include an audio file such as a music clip, a video file, a text file such as an e-book, a multimedia file and a movie. The media assets may be stored in a storage unit of the tablet device. The media assets may also be delivered from a server in the Internet to the portable tablet device.

Figure 1:
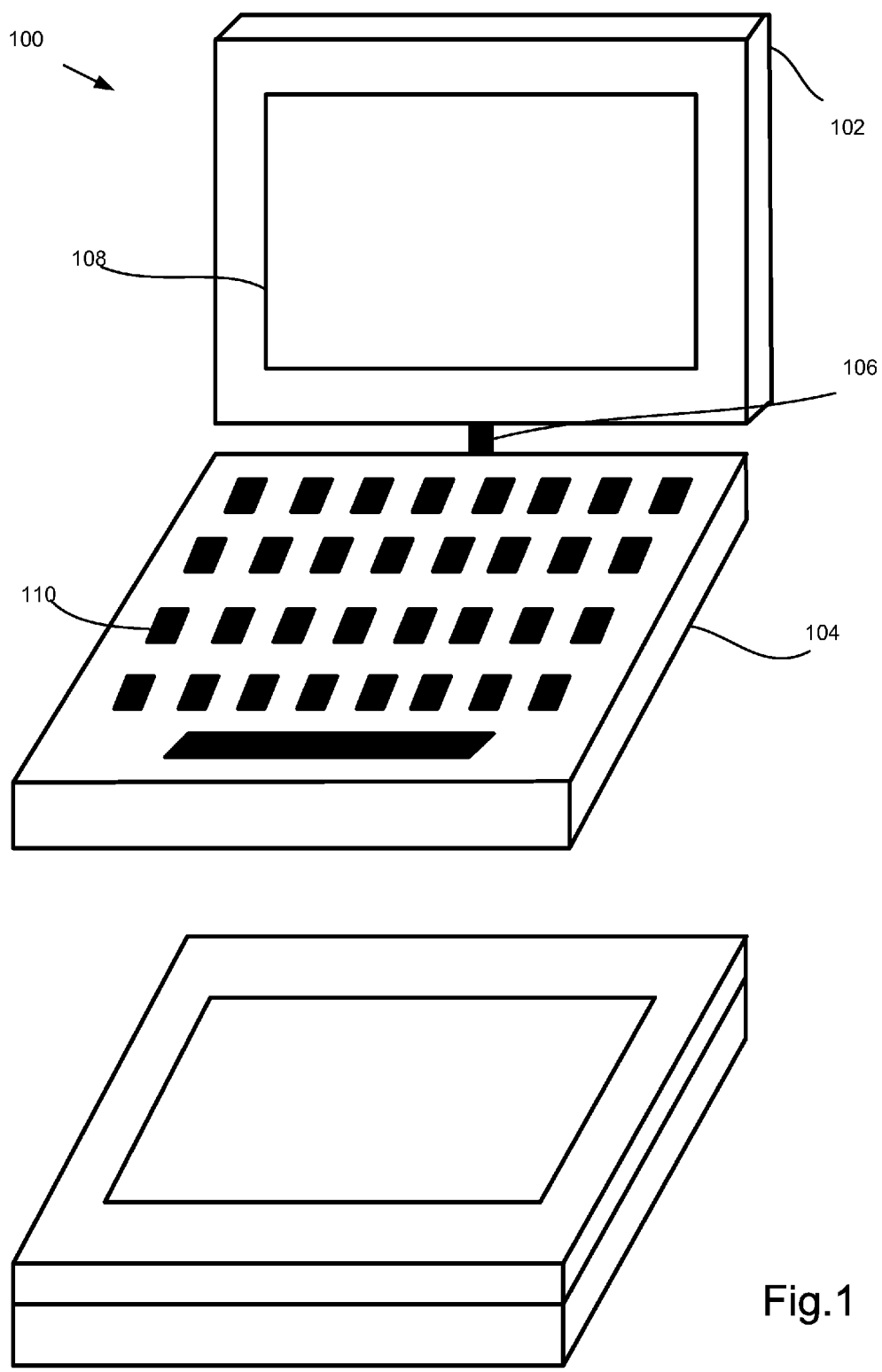
FIG. 1 is a schematic diagram illustrating an exemplary portable tablet device with the display screen in two operable positions.

FIG. 1 is a schematic diagram illustrating an exemplary portable tablet computing device 100. The device 100 comprises a display part 102, a housing part 104 and a pivot and hinge part 106. The display part 102 further comprises a display screen 108. According to a preferred embodiment of the present invention, the display screen 108 is a touchscreen type of LCD. The housing part 104 comprises a keyboard 110. The housing part 104 may further comprise a pointing device such as a pointing device. The electronic components of the device 100 are mostly contained in the housing part 104. The pivot and hinge part 106 provides a mechanism for positioning the display screen 108 to be either on the top face of the device or in a conventional position for the netbook.

Figure 2:
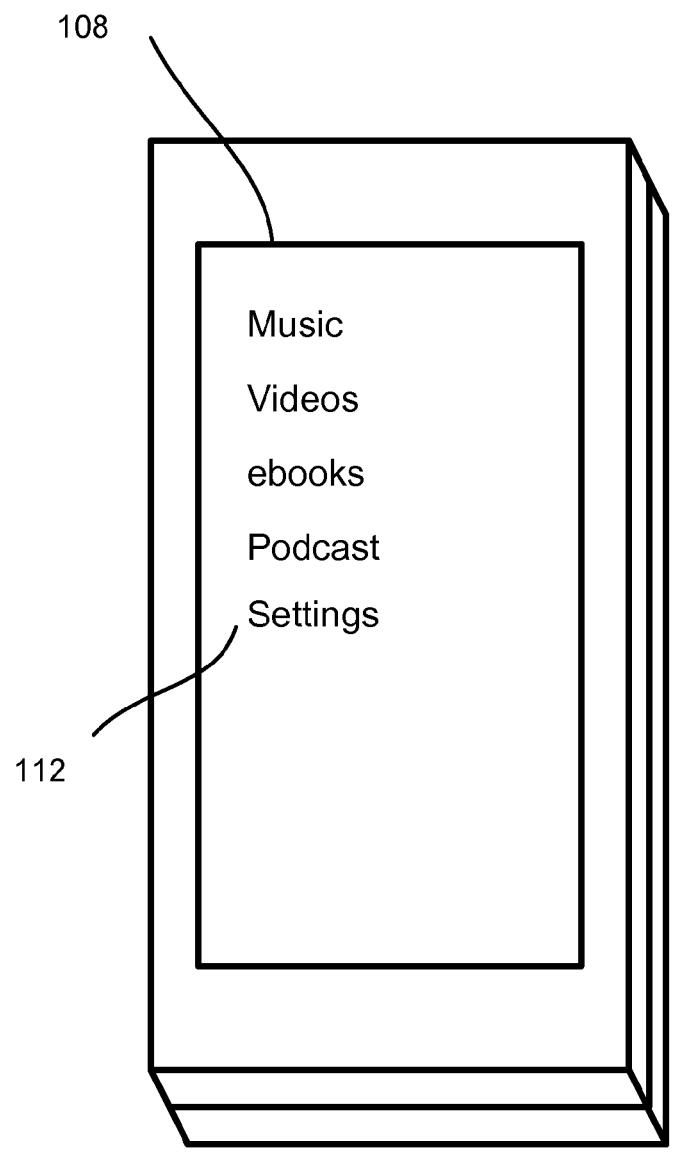
FIG. 2 is a schematic diagram illustrating that the device is used as a media player with a hierarchical user interface when the display screen is on the top face of the device.

FIG. 2 is a schematic diagram illustrating that the device is used as a media player with a hierarchical user interface when the display screen is on the top face of the device. When the device is used as a media player, the device is operated in a low power mode. A hierarchical user interface 112 is employed to guide the user to select a desired media asset in a hierarchical manner.

Figure 3:
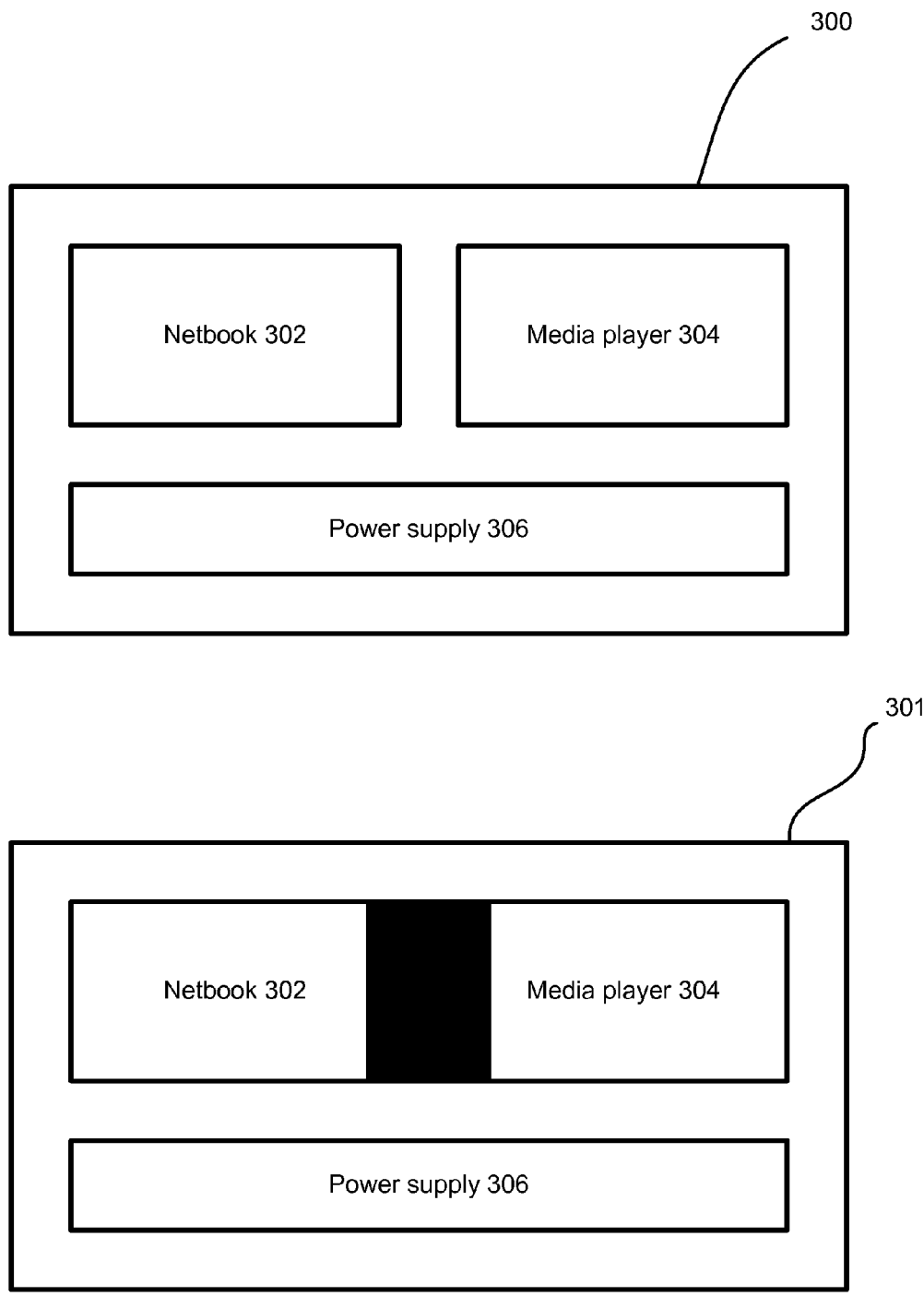
FIG. 3 is a schematic diagram illustrating two different implementations of the improved portable tablet computing device design.

FIG. 3 is a schematic diagram illustrating two different implementations of the device design. As illustrated in 300, the netbook 302 and the media player 304 may be two different devices in one package sharing the same power supply 306. As shown in 301, the netbook 302 and the media player 304 may share some components in additional to sharing the power supply 306. The shared components may include storage unit and some signal processing units.

Figure 4:
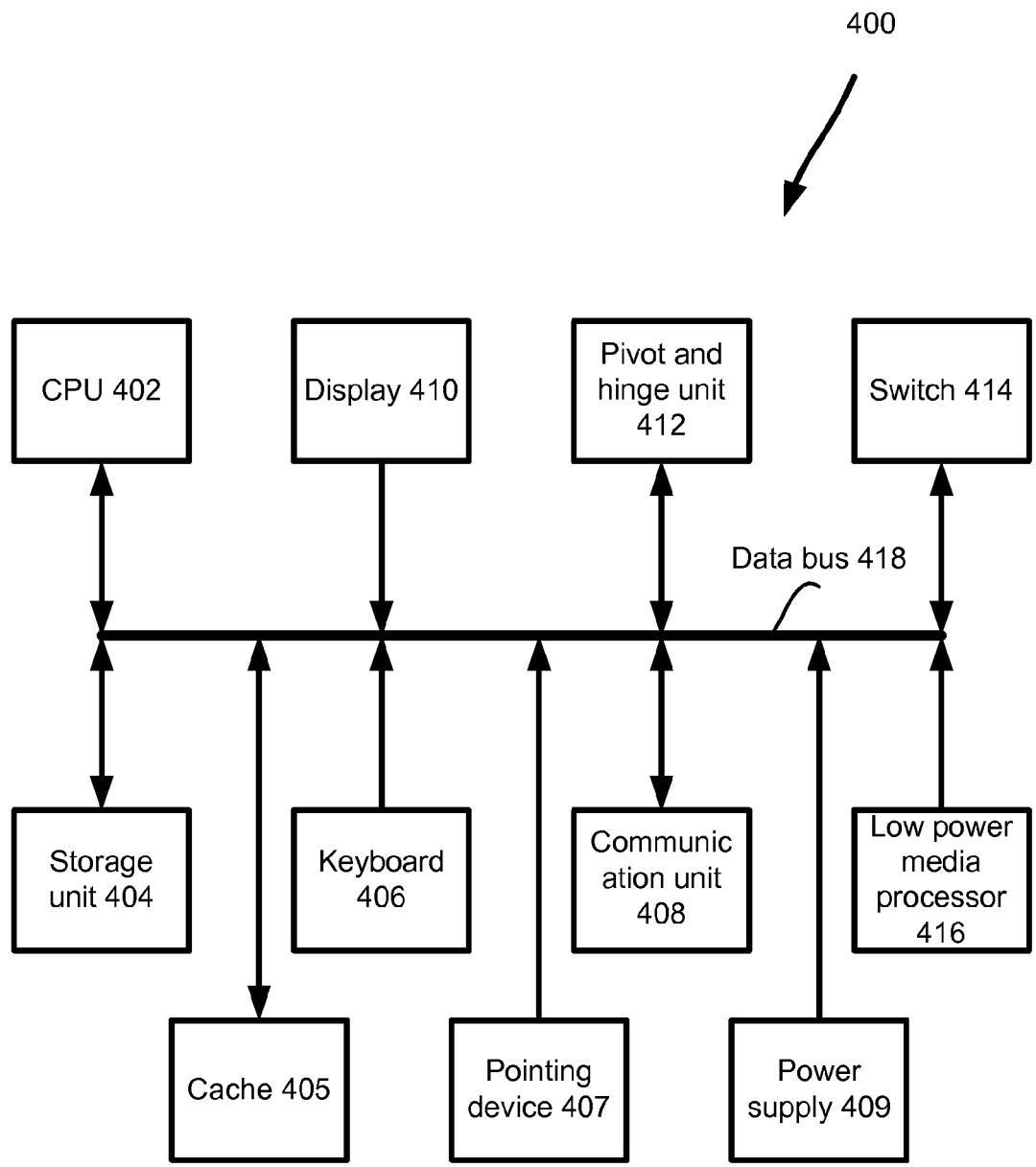
FIG. 4 is a schematic diagram illustrating functional blocks of an exemplary implementation of the device.

FIG. 4 is a schematic diagram illustrating functional blocks of an exemplary implementation of the device. The exemplary portable tablet computing device 400 comprises a CPU (Central Processing Unit) 402 for controlling operations of the device. The tablet device 400 further comprises a storage unit 404 and a cache 405. The storage unit 404 may be one or a plurality of flash memory devices. The storage unit 404 may also be a magnetic storage device. The cache 405 may be a SRAM (Static Random Access Memory) providing a short access time. The tablet device 400 also includes input devices such as a keyboard 406 and a pointing device 407. A pointing device may be a mouse or a touch-pad. A communication unit 408 is used to connect the tablet device 400 to a communication network such as the Internet. The communication network may also be an ad hoc network conforming to various protocols such as Bluetooth, ZigBee and WiFi. The power supply 409 provides power for the operations of the tablet device 400. The power supply 409 may be a rechargeable battery in an exemplary case.

The tablet device 400 includes a display screen 410. 410 may be a LCD type of touchscreen display. The display screen 410 is encased on the display part supported by a pivot and hinge part 412. The display screen 410 may be pivoted to one of two operable positions: one is on the top face of the device and another is in a conventional position for the netbook. A switch 414 is used to provide a switching means for device to be operated as a dedicated media player or as a general purpose computing device. The low power media processor 416 may comprise a low power processor, a DSP (Digital Signal Processor) and a CODEC (Coding and Decoding). The device 400 operated as a media player may consume significantly less power by design. The low power media processor 416 may comprise a low power operation mode of the CPU 402 in an alternative implementation. The data bus 418 provides a means for the high speed data transfer.

Figure 5:
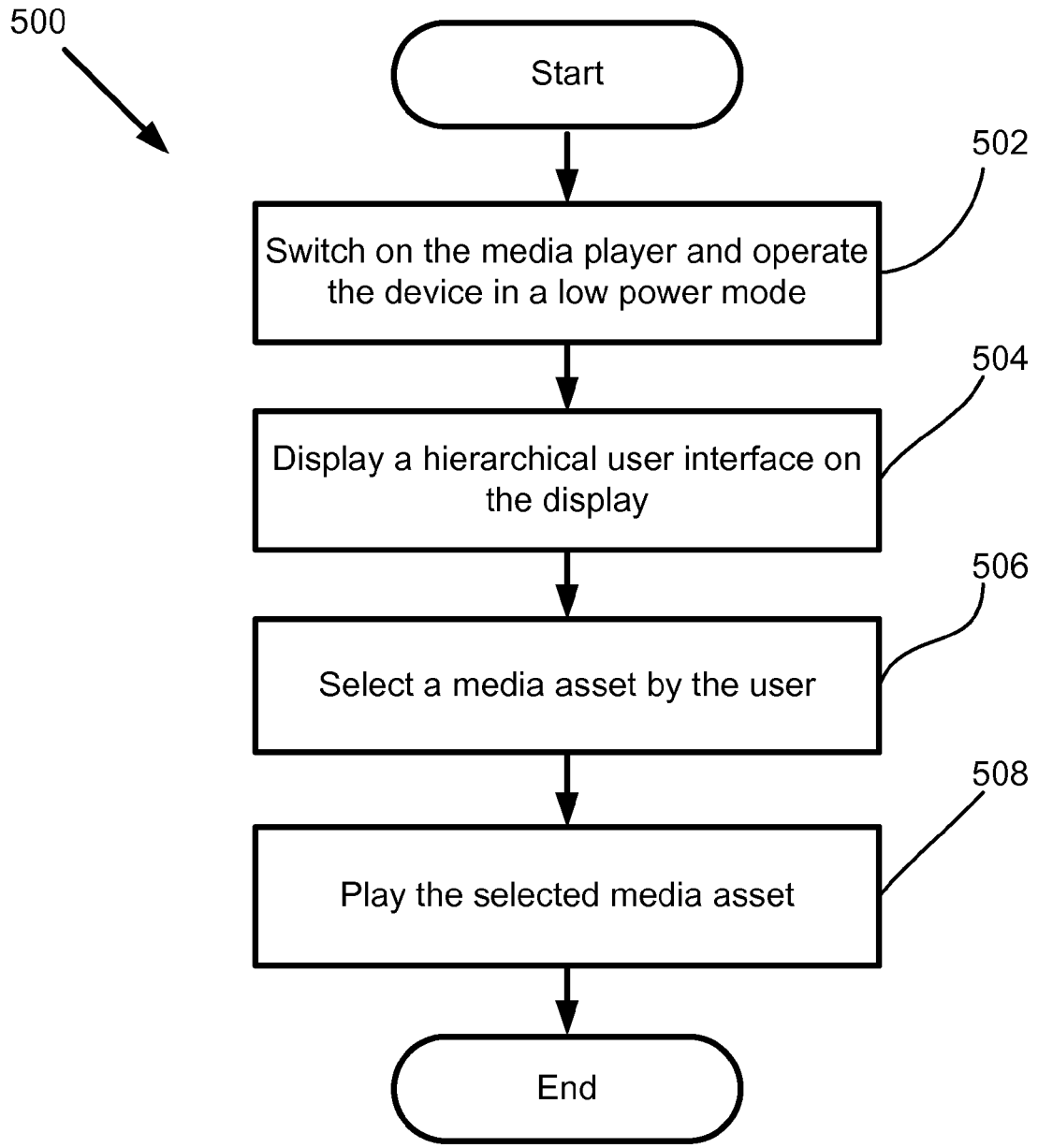
FIG. 5 is a flowchart illustrating the operation of the device as a dedicated media player.

FIG. 5 is a flowchart illustrating the operation of the tablet device as a dedicated media player. Process 500 starts with step 502 that the device is switched on as a dedicated media player. The device is operated in a low power mode as the media player. As described previously in the present disclosure, the display screen is on the top face of the device when it is operated as a dedicated media player. A hierarchical user interface is displayed on the screen in step 504. The user selects in step 506 a media asset by using the hierarchical user interface in a progressive manner. The selected media asset is played in step 508. The media asset may be an audio file, a video file, a text file, a multimedia file or a movie. The media assets may be stored in the storage unit of the tablet device. The media asset may also be stored in a computing device connected to the tablet device through a communication network such as the Internet. The media asset may further be delivered to the tablet device through the Internet. The media asset may still further be delivered to the user through an ad hoc communication network conforming to protocols such as Bluetooth, ZigBee or WiFi. A user may need to purchase the media assets, which are not own by the user.

Figure 6:
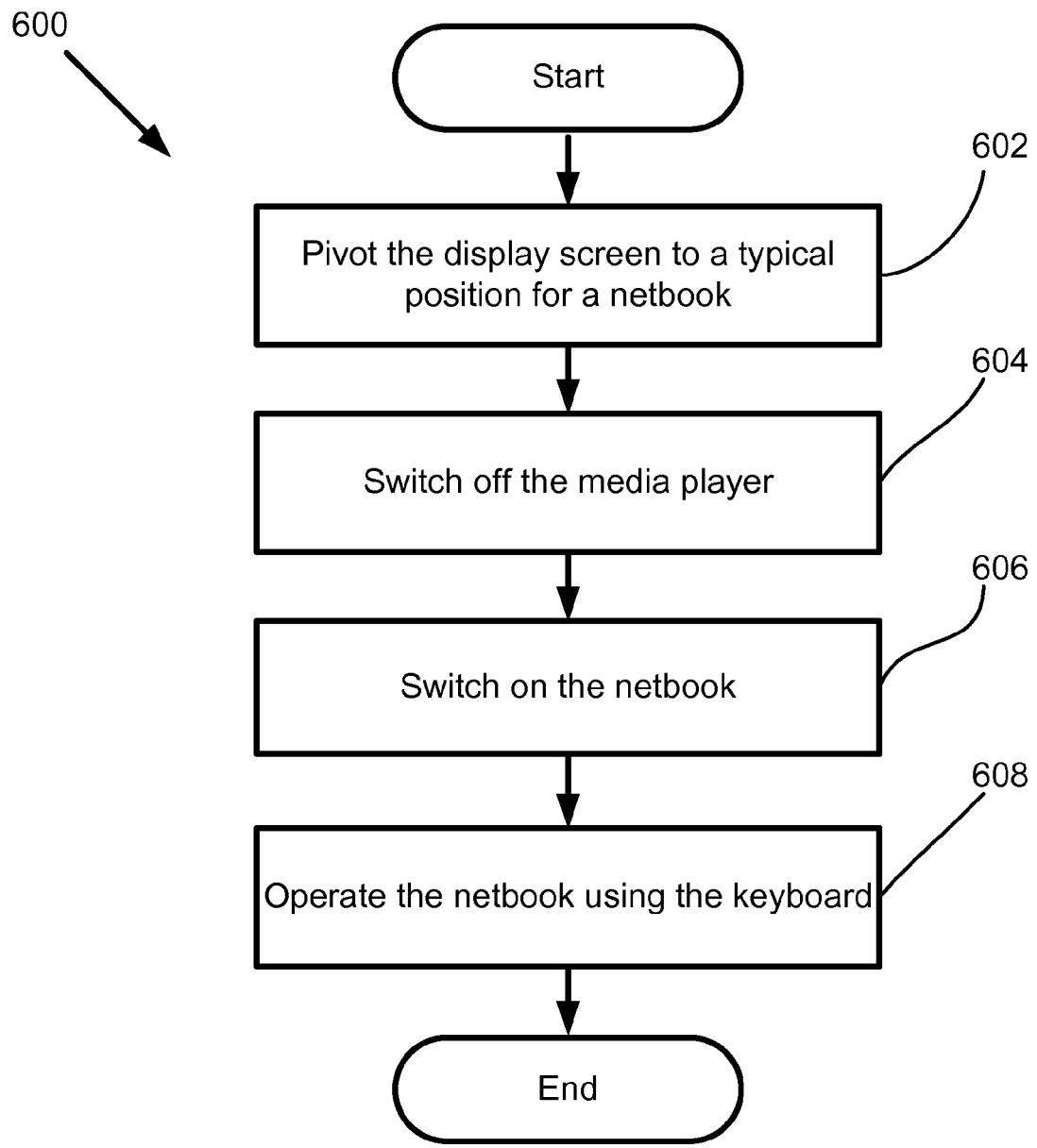
FIG. 6 is a flowchart illustrating a process that the device is switched from a dedicated media player to a conventional netbook.

FIG. 6 is a flowchart illustrating a process that the tablet device is switched from a dedicated media player to a netbook. Process 600 starts with step 602 that the display screen is pivoted to a typical position for a netbook. The media player is switched off in step 604. The netbook is switched on in step 606. The device is operated as a netbook in step 608 by the user using the keyboard and/or other input device such as a pointing device.

The invention claimed is:

1. A portable computing device in a flip form factor, the device comprising:
   a. a display part having two surfaces, wherein one of the surfaces comprises a touch-screen type of display;
   b. a housing part comprising a Central Processing Unit, a storage unit, an input device and a communication unit;
   c. a hinge and pivot part for connecting the display part and the housing part and for pivoting the display part; and
   d. two exclusive operation modes including:
      i. a general purpose computing device when the display screen is facing the housing part; and
      ii. a low power media player when the display screen is pivoted to be on the top face of the device, wherein said media player having a hierarchical user interface controlled by a low power media processor.

2. The device as recited in claim 1, wherein said operation modes are selectable by a switch.

3. The device as recited in claim 1, wherein said general purpose computing device and said low power media player having independent functional blocks other than sharing a power supply and said display screen.

4. The device as recited in claim 1, wherein said input devices further comprising a keyboard and/or a pointing device.

5. The device as recited in claim 1, wherein said device further comprising a power supply for providing power for the operations of the device.

6. The device as recited in claim 1, wherein said low power media processor comprising a low power operating mode of said Central Processing Unit.

7. The device as recited in claim 1, wherein said portable computing device comprising a netbook.

8. The device as recited in claim 1, wherein said media player delivering a media asset from the following group comprising:
   a. an audio file;
   b. a video file;
   c. an e-book file;
   d. a multi-media file; and
   e. a movie.

9. A method of employing a portable computing device as either a computer or a low power media player in an exclusive manner, wherein said device is in a flip form factor including a display part with a touch-screen type of display on one of the two surfaces of the display part, a housing part and a hinge and pivot part for connecting the display part and the housing part, the method comprising:
   a. operating said device as the computer when the display screen is pivoted to face the housing part;
   b. pivoting the display screen to be on a top face of the device;
   c. switching the device to a low power operation mode as a dedicated media player;
   d. displaying a hierarchical user interface in the display screen;
   e. selecting a media asset; and
   f. playing the selected media asset.

* * * * *